United States Patent [19]

Martin

[11] Patent Number: 4,603,026
[45] Date of Patent: Jul. 29, 1986

[54] METHOD OF PROVIDING A SENSOR PROBE AND/OR A SENSOR PROBE

[75] Inventor: Gerald S. Martin, Auckland, New Zealand

[73] Assignee: Fisher & Paykel Limited, Auckland, New Zealand

[21] Appl. No.: 683,236

[22] Filed: Dec. 18, 1984

[30] Foreign Application Priority Data

Dec. 22, 1983 [NZ] New Zealand .......................... 206715

[51] Int. Cl.$^4$ .......................... B29C 45/14; G01K 7/16
[52] U.S. Cl. .................................. 264/272.18; 29/618; 374/185
[58] Field of Search .................. 374/183, 185, 208; 264/272.18; 29/618; 338/22 R

[56] References Cited

U.S. PATENT DOCUMENTS

| 1,809,089 | 6/1931 | Wiegand | 29/618 X |
| 2,191,765 | 2/1940 | Lohman | 374/185 |
| 3,051,774 | 8/1962 | Schelke | 174/135 |
| 3,064,335 | 11/1962 | Fletcher | 29/618 X |
| 3,093,432 | 6/1963 | King | 264/272.18 X |
| 3,668,779 | 6/1972 | Turner | 29/883 X |
| 4,215,336 | 7/1980 | Smith | 374/185 X |

Primary Examiner—Daniel M. Yasich
Attorney, Agent, or Firm—Holman & Stern

[57] ABSTRACT

A method of providing a sensor probe which includes the steps of providing a core which has a circumferential wall. The circumferential wall has one or more channels which position one or more conductors in the channel or channels and retain the wire or wires in the channel or channels.

9 Claims, 4 Drawing Figures

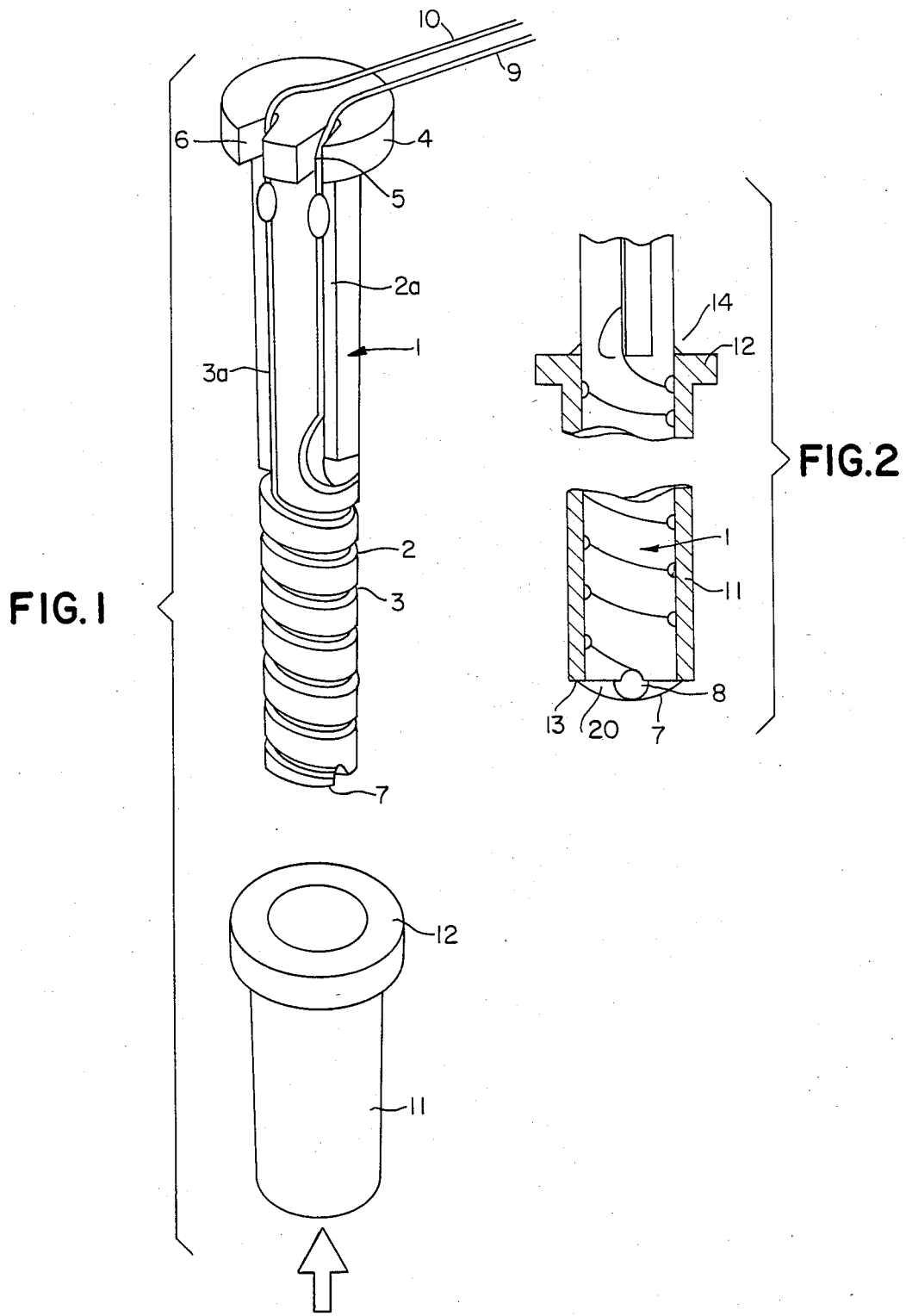

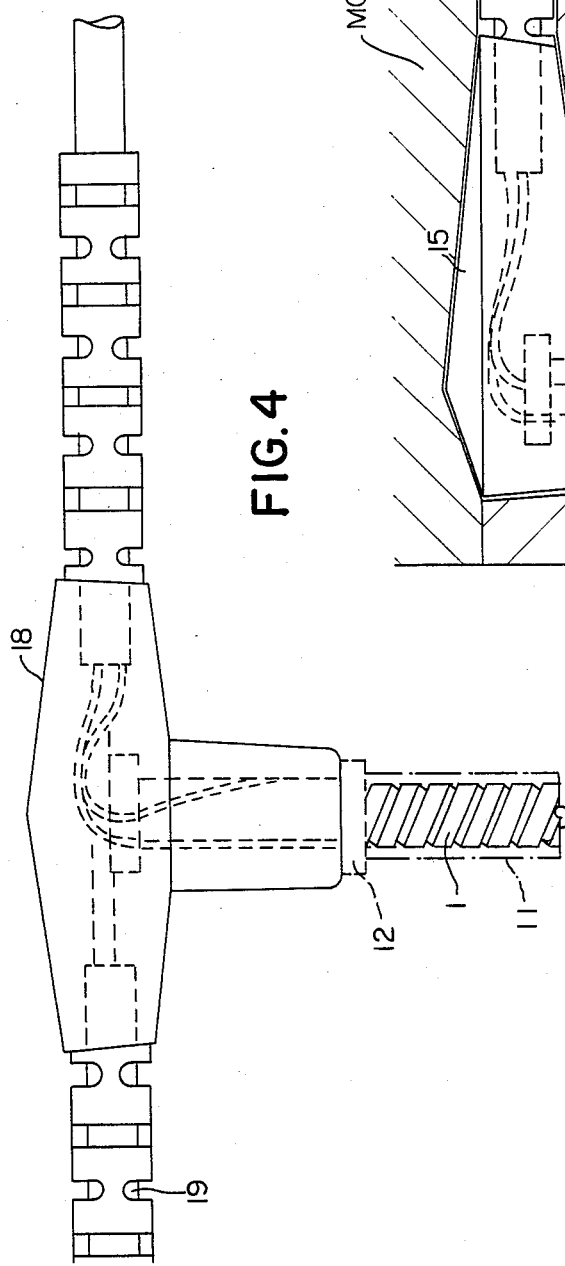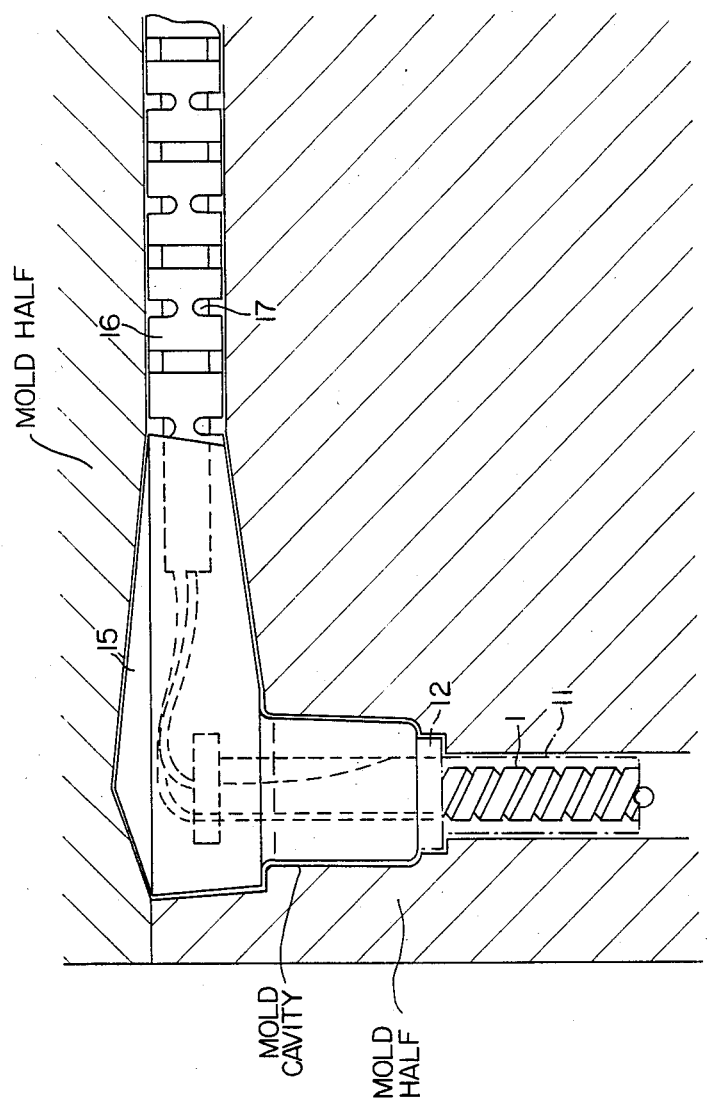

METHOD OF PROVIDING A SENSOR PROBE AND/OR A SENSOR PROBE

This invention relates to a method of providing a sensor probe and/or a sensor probe.

In the production of devices such as sensor probes it is desirable to provide a long path for conducting wires which are engaged with the sensing element. It is also desirable to mould at least a substantial proportion of the plastics material forming the body of the sensor probe in a single operation. There are difficulties in performing the moulding operation whilst yet providing a long conducting path as there is a tendency for wires to fall from the member on which they are mounted whilst being inserted for example into a mould cavity as the wires can readily fall from that mounting device thereby leading to rejects in the probes so formed.

Previous attempts to overcome this problem have included for example placing silicon grease material over the conductor wires but this has not been entirely successful as it does not provide a positive fixing of the wires to the member on which the wires are mounted and of course the grease can become positioned in this end disadvantageous positions.

It is therefore an object of the present invention to provide a method of providing a sensor probe and/or a sensor probe which will at least provide the public with a useful choice.

Accordingly in one aspect the invention consists in a method of providing a sensor probe including the steps of providing a core having a circumferential wall, which said circumferential wall has one or more channels, positioning one or more conductors in said channel or channels, and retaining said wire or wires in said channel or channels.

In a further aspect the invention consists in a sensor probe when constructed according to the method of the preceding paragraph.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

One preferred form of the invention will now be described with reference to the accompanying drawings in which:

FIG. 1 is a diagrammatic perspective view of a core and sleeve for use in a sensor probe according to one preferred form of the invention;

FIG. 2 is a cross sectional view of a core and sleeve in engagement in one preferred form of the invention;

FIG. 3 is a diagrammatic side elevation of a sensor probe according to one preferred form of the invention; and FIG. 4 is a view as in FIG. 3 of an alternative embodiment of the invention.

Referring to the drawings a sensor probe particularly for sensing a physical condition, as for example temperature is constructed as follows:

The sensor probe comprises a core 1 of an electrically insulating material such as a suitable plastics material such as polyvinylchloride.

The circumferential wall of the core 1 has one or more channels preferably formed by grooves in the circumferential wall. Preferably a pair of grooves 2 and 3 are provided in the form of a double start helix extending along at least part of the length of the core 1 but terminating if desired in grooves 2a and 3a parallel to the longitudinal axis of the core 1.

The upper end of the core 1 may be provided with a head 4 which has slots 5 and 6 therein adjacent the ends of grooves 2a and 3a where they meet the head 4. Thus grooves 2, 2a and slot 5 and grooves 3, 3a and slot 6 each form a continuous slot.

A depression can be provided at the other end 7 of the core 1. A sensing element, and where temperature is to be sensed, for example, a thermistor 8, can be positioned within the depression at end 7 and connected to electrically conducting wires. In the case of the thermistor 8 these are wires 9 and 10 which are positioned within the grooves 2 and 2a, as well as grooves 3 and 3a and also pass through slots 5 and 6.

The wires are retained in the grooves and this may be achieved by providing a preformed sleeve 11 which may have a flanged end 12 if desired and which is desirably open at each end, and which is placed over the core 1 so as to extend at least over the grooves 2 and 3, that is to say, the spiral or helical parts of the grooves. The sleeve 11 is again desirably formed of a plastics material such as polyvinylchloride.

The sensing element such as thermistor 8 is then encapsulated in a suitable barrier material such as an epoxy resin which also desirably extends onto the lower end 13 of the sleeve 11 as shown for example in FIG. 2, so as to provide a seal at the end 7 of the core 1 between the core 1 and the sleeve 11.

It is also desired to seal the connection between the flange 12 and the core 1 for example as shown at 14 in FIG. 2. Again this may be performed by means, for example, of an epoxy resin.

The probe so far constructed may then be placed in the cavity of an injection mould and the wires suitably positioned so that a settable material such as a plastics material, such as polyvinylchloride can then be injected into the mould to form a cover and grip 15 as shown in FIG. 3, and also desirably a flexible strain relief moulding over electrical cable 17. This moulding step is effected so that the integrity of the wiring, thermistor and connections is maintained. The construction of FIG. 3 shows a right angle moulded sensor probe and the construction of FIG. 4 in which a moulding 18 is provided shows an inline construction wherein the sensor probe is provided in a cable 19.

Thus it can be seen that a method of providing a sensor probe and/or a sensor probe are provided in which the sensor probe can be formed in a simple yet effective manner. The provision of the sleeve 11 allows the conductors to the sensing element to be retained in the desired position during the moulding process to form the grip or housing 15 or 18. Also the bulk of the parts for the sensor probe can be preformed leaving only a single moulding operation during the final assembly which is desirable.

What is claimed is:

1. A method of making a sensor probe to sense a varying condition, such as temperature, including the steps of providing a core having a circumferential wall, said circumferential wall having one or more channels, providing a sensor at one end of the probe, positioning one or more conductor wires from said sensor in said channel or channels by securing a sleeve in a predetermined position over said core and said wire or wires, and moulding a cover over at least a part of the core above the sleeve.

2. A method of making a sensor probe that senses a varying physical condition comprises the steps of providing a core having a circumferential wall, which said circumferential wall has one or more channels, positioning a sensor at one end of said probe and providing one or more conductor wires from said sensor in said channel or channels by securing a sleeve in a predetermined position over said core and said wire or wires, placing said core, said sleeve and said conductor wires or conductors within the cavity of a mould, and inserting suitable material into said mould so as to complete said sensor probe by moulding a cover over at least a part of the core above the sleeve.

3. A method of providing a sensor probe as claimed in claim 2 wherein said sleeve is open at each end.

4. A method of providing a sensor probe as claimed in claim 2 wherein two of said channels are provided in said circumferential wall, said channels forming a double start helix on said core.

5. A method of providing a sensor probe as claimed in claim 2 wherein said conductors comprise electrically conducting wires, a thermistor being provided at the end of said core and said wires being engaged with said thermistor, said wires being positioned in said channels.

6. A method of providing a sensor probe as claimed in claim 2 wherein said channel or channels are provided by grooves in said circumferential walls.

7. A method of providing a sensor probe as claimed in claim 2 wherein a depression is provided in one end of said core, said thermistor being positioned in said depression.

8. A method of providing a sensor probe as claimed in claim 7 wherein said thermistor and the end of said core are covered by a barrier material.

9. A method of providing a sensor probe as claimed in claim 8 wherein said barrier material comprises an epoxy resin.

* * * * *